United States Patent [19]

von der Ohe et al.

[11] Patent Number: 4,473,241
[45] Date of Patent: Sep. 25, 1984

[54] SUPPORTING BODY FOR WHEEL GUIDE MEMBERS OF MOTOR VEHICLE WHEELS

[75] Inventors: Manfred von der Ohe, Stuttgart; Helmut Flemming, Hochdorf, both of Fed. Rep. of Germany; Dirk Siebelt, Weinstadt, Netherlands

[73] Assignee: Daimler-Benz Aktiengesellschaft, Fed. Rep. of Germany

[21] Appl. No.: 333,979

[22] Filed: Dec. 23, 1981

[30] Foreign Application Priority Data

Dec. 23, 1980 [DE] Fed. Rep. of Germany ....... 3048793

[51] Int. Cl.³ ............................................. B62D 21/00
[52] U.S. Cl. ...................................... 280/781; 52/731
[58] Field of Search .................. 280/96.2 R, 666, 781, 280/785; 296/35.1, 35.3; 224/42.45 R; 52/720, 731

[56] References Cited

U.S. PATENT DOCUMENTS 3,177,031  4/1965  Schilberg ........................... 296/35.1
3,851,912 12/1974  Grosseau ........................... 296/35.1

FOREIGN PATENT DOCUMENTS 970980 11/1958 Fed. Rep. of Germany ...... 280/666
1480446  8/1969 Fed. Rep. of Germany ... 280/96.2 R
155824  8/1956 Sweden ............................. 296/35.1
261176  8/1949 Switzerland ...................... 296/35.1

Primary Examiner—Joseph F. Peters, Jr.
Assistant Examiner—Ross Weaver
Attorney, Agent, or Firm—Craig and Burns

[57] ABSTRACT

A supporting body for wheel guide members of motor vehicle wheels, especially rear wheels. The supporting body is adapted to be fastened to the vehicle body in end areas thereof by way of at least one elastic element. The supporting body is formed of two stamped or pressed sheet metal members, with each of the members being flat at one end and shell-shaped at the opposite end. The two sheet metal members are joined together in such a manner that in each case the flat end portion of one sheet metal member covers the shell-shaped portion of the opposite sheet metal member.

7 Claims, 2 Drawing Figures

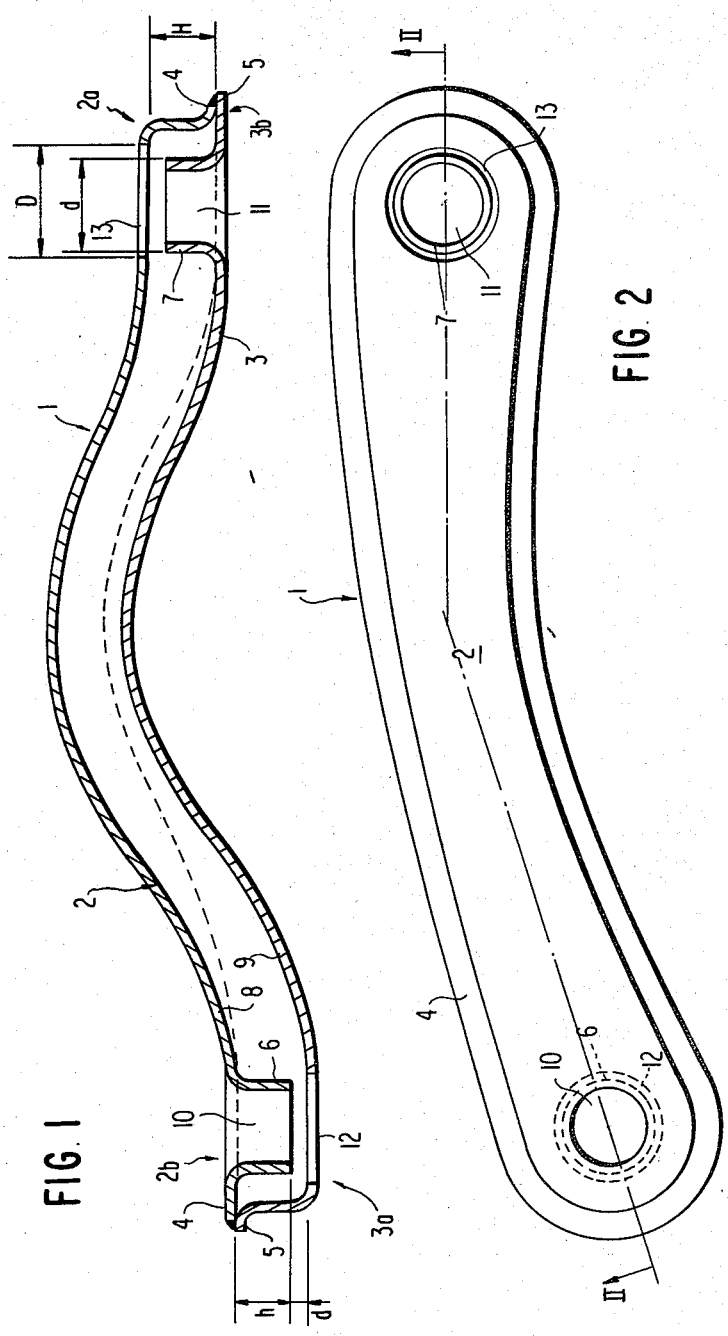

SUPPORTING BODY FOR WHEEL GUIDE MEMBERS OF MOTOR VEHICLE WHEELS

The present invention relates to a support arrangement and, more particularly, to a supporting body for wheel guide members of motor vehicle wheels, especially rear wheels, wherein respective ends of the supporting body are adapted to be fastened, with respect to a body of the vehicle, by at least one elastic element, with the supporting body being constructed as a hollow body formed of two stamped sheet metal members, with one of the sheet metal members being shell or dish-shaped cross section and the other sheet metal member being flat cross section and forming a cover for the shell or dish-shaped sheet metal member, and with the cover being provided with a collar projecting into the shell or dish-shaped sheet metal member so as to form a wall of an opening for accommodating particular fastening elements.

In, for example, German Pat. No. 1,555,163, a V-shaped supporting body is provided wherein a first stamped or pressed sheet metal member has a shell or dish-shape in an area of both ends thereof, with a second sheet metal member having a flat configuration along its entire length, and with collars being provided in the flat sheet metal member at respective end areas thereof.

A disadvantage of the above-noted proposed construction resides in the fact that, with both of the collars being provided on the flat sheet metal member, very different press dies are required. Moreover, when the same fastening elements are used and inserted in the supporting body on the same side, if the insertion opening is not to be made the same from both sides, difficulties are encountered in the production of the drawn-in portions which are then necessary on the shell-shaped sheet metal members.

The aim underlying the present invention essentially resides in providing a supporting body for wheel guide members of a motor vehicle, especially for rear wheels of the motor vehicle which utilizes two stamped or pressed sheet metal members having basically the same construction, and which enables fastening elements for the supporting body to be inserted from opposite sides thereof.

In accordance with advantageous features of the present invention, each stamped or pressed sheet metal member is constructed so as to be flat at one end thereof and shell or dish-shaped at the other end thereof, with the two sheet metal members being joined together in such a manner that, in each case, the flat cover of one sheet metal member covers a shell-shaped part of the other sheet metal member.

By virtue of the above-noted features of the present invention, it is possible to insert the fastening elements from opposite sides at the two ends of the supporting body without adaptation having to be made to the shell or dish-shaped ends of the respective body. Additionally, it is also possible for the supporting body, if appropriate, to be constructed of two identical sheet metal members.

Accordingly, it is an object of the present invention to provide a supporting body for wheel guide members of motor vehicle wheels, especially rear wheels, which avoids, by simple means, shortcomings and disadvantages encountered in the prior art.

Another object of the present invention resides in providing a support body for wheel guide members of motor vehicle wheels which is simple in construction and therefore relatively inexpensive to manufacture.

Yet another object of the present invention resides in providing a supporting body for wheel guide members of motor vehicle wheels which enables a fastening of the supporting body from opposite sides thereof.

A still further object of the present invention resides in providing a supporting body for wheel guide members of motor vehicle wheels which functions reliably under all load conditions applied thereto.

These and other objects, features, and advantages of the present invention will become more apparent from the following description when taken in connection with the accompanying drawing which shows, for the purposes of illustration only, one embodiment in accordance with the present invention, and wherein:

FIG. 1 is a plan view of a supporting body for wheel guide members of a motor vehicle constructed in accordance with the present invention; and FIG. 2 is a cross-sectional view taken along the line II—II in FIG. 1.

Referring now to the drawing wherein like reference numerals are used in both views to designate like parts and, more particularly, to FIG. 1, according to this Figure, a supporting body generally designated by the reference numeral 1 includes two stamped or pressed sheet metal members 2, 3, with each of the sheet metal members 2, 3 being provided with an outwardly projecting edge or rim 4, 5 extending around a periphery of each of the sheet metal members 2, 3. The sheet metal members 2, 3 are joined to each other along the edges or rims 4, 5 by, for example, welding.

The sheet metal member 2 has a first end area generally designated by the reference numeral 2a which has a shell or dish-shaped configuration, with the sheet metal member 2 merging into a flat end portion in a second end area generally designated by the reference numeral 2b. The sheet metal member 3, as with the sheet metal member 2, is also shell or dish-shaped in a first end area generally designated by the reference numeral 3a and terminates in a flat end portion in a second end area generally designated by the reference numeral 3b. The sheet metal members 2, 3, when assembled, form the hollowing supporting body 1, with the shell or dish-shaped end areas 2a, 3a of the respective sheet metal members 2, 3 defining a free inner height H of the hollow supporting body 1. The sheet metal members 2, 3 are respectively provided in the end areas 2b, 3b with collar portions 6, 7, with the collar portions 6, 7 respectively projecting from a body surface 8, 9 of the sheet metal members 2, 3 in the same direction as walls of the sheet metal members 2, 3 defining the shell or dish-shape.

As illustrated most clearly in FIG. 2, the two sheet metal members are arranged with respect to one another in a complementary fashion so as to form the hollow supporting body 1, with the flat terminating end portion of each of the sheet metal members 2, 3 in the end areas 2b, 3b, respectively, covering the shell or dish-shaped end areas 2a, 3a of the respective sheet metal members 2, 3.

The collars 6, 7 define walls of openings 10, 11 for enabling insertion and accommodation of elastic fastening elements (not shown) by which the supporting body 1 is fastened to a body of a motor vehicle (not shown). Suitable coupling means (not shown) are provided for enabling a coupling or connecting of the supporting body 1 with wheel guide members (not shown). The shell or dish-shaped end areas 2a, 3a are respectively provided with openings 12, 13 aligned with the openings 10, 11 defined by the collars 6, 7. In the illustrated embodiment, the openings 12, 13 have a diameter D slightly larger than an outer diameter d of the collars 6, 7.

In the illustrated embodiment, the collars 6, 7 have a height h which is less than the inner height H of the hollow supporting body 1 so that the collars 6, 7 do not project to the opposite bottom surfaces 8, 9 of the respective shell-shaped end areas 2a, 3a of the sheet metal members 2, 3 but rather terminate at a certain distance d from the respective bottom surfaces 8, 9. Thus, there is no connection between the collars 6, 7 and the respective opposite bottom surfaces 8, 9 of the sheet metal members 2, 3.

Supporting bodies 1 of the above-noted type are preferably installed so as to extend in a longitudinal direction of the vehicle and, when installed in a vehicle, the supporting body 1 is loaded, through the wheel guide members articulated thereto, in such a manner that, as viewed in a normal driving direction of the vehicle, the wheel forces transmitted through the wheel guide members load the supporting body 1 in an area of the collar 6 against the vehicle body, while a load in the opposite direction is provided in an area of the collar 7.

The supporting body 1 described hereinabove may be especially utilized as a component of an auxiliary frame for a vehicle, with the auxiliary frame including two supporting bodies 1, extending in a longitudinal direction of the vehicle, and, preferably, two connecting struts (not shown) extending in a transverse direction of the vehicle, with the connecting struts being constructed as open profile members flexible in torsion, with respect to their longitudinal axes extending in the transverse direction of the vehicle, but resistant to bending forces with respect to forces perpendicular to their longitudinal axes.

If the supporting body 1 as a whole is symmetrically constructed with respect to a transverse center plane, then, unlike the illustrated embodiment, the supporting body 1 may be fashioned of two identical sheet metal members which is especially favorable in terms of manufacturing or production of the support body 1. However, in the illustrated construction of the supporting body 1, favorable production conditions are nevertheless obtainable since the sheet metal members 2, 3 are very similar to one another and each are made largely uniform with respect to a decreasing in the depth H of the shell or dish-shaped ends so that there are favorable preconditions for a connection of the sheet metal members 2, 3 along the peripheral edges or lips 4, 5. This is all the more so when the supporting body 1 is, in a plan view, substantially straight and, in a side view, only slightly curved such as respectively shown in FIGS. 1 and 2.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A supporting body for wheel guide means of a motor vehicle, the supporting body comprising
   a first and second sheet metal member, each of the sheet metal members having a first end portion having a shell-shaped configuration and a second flat end portion,
   the first and second sheet metal members joined to form a hollow body with a second flat end portion of each of the respective sheet metal members covering the shell-shaped first end portion of the other of the sheet metal members,
   means at least at respective ends of the first and second sheet metal members for accommodating fastening means so as to enable a fastening of the supporting body to a portion of the motor vehicle,
   the means for accommodating comprising a collar means provided on each of the sheet metal members at the second flat end portions thereof, the collar means being arranged on each of the respective sheet metal members for projecting in a direction towards the shell-shaped end portion of the opposite sheet metal member.

2. A supporting body according to claim 1, wherein the wheel guide means are connected to rear wheels of the motor vehicle via said supporting means,
   the supporting body extending in a longitudinal direction of the vehicle for loading the supporting body at a first end thereof from a wheel guide member articulated thereto in a first area of a first of said collar means against the vehicle, and
   for loading the supporting body in a second area of a second of said collar means in an opposite direction at a second end of the supporting body.

3. A supporting body according to claim 1, wherein the means for accommodating further comprises openings provided in the shell-shaped first end portions of each of the respective sheet metal members, the openings being disposed in alignment with openings of the respective collar means.

4. A supporting body according to claim 3, wherein the openings have a diameter greater than an outer diameter of the collar means.

5. A supporting body according to claim 4, wherein the respective collar means project into the shell-shaped end of the opposite sheet metal member terminating at a predetermined distance from a bottom surface of the opposite sheet metal member.

6. A supporting body according to claim 1, wherein each of the sheet metal members is provided with a radially outer projecting rim along a periphery thereof for enabling a joining of the sheet metal members to each other to form the hollow body.

7. A supporting body according to claim 1, wherein said first and second sheet metal members are identical in configuration for arrangement with respect to one another in complementary fashion to form the hollow supporting body.

* * * * *